(12) United States Patent
Roman (10) Patent No.: US 9,544,539 B2
(45) Date of Patent: Jan. 10, 2017

(54) OPTICAL ADAPTERS FOR MOBILE DEVICES WITH A CAMERA

(71) Applicant: Kendyl A Roman, Sunnyvale, CA (US)

(72) Inventor: Kendyl A Roman, Sunnyvale, CA (US)

(*) Notice: Subject to any disclaimer, the term of this patent is extended or adjusted under 35 U.S.C. 154(b) by 242 days.

(21) Appl. No.: 13/969,466

(22) Filed: Aug. 16, 2013

(65) Prior Publication Data

US 2013/0328999 A1    Dec. 12, 2013

Related U.S. Application Data

(63) Continuation of application No. 12/459,375, filed on Jun. 29, 2009, now abandoned.

(51) Int. Cl.
| | | |
|---|---|---|
| *H04N 21/47* | (2011.01) |
| *H04N 7/15* | (2006.01) |
| *H04N 5/225* | (2006.01) |
| *H04N 7/14* | (2006.01) |
| *H04N 21/422* | (2011.01) |
| *H04N 21/4223* | (2011.01) |
| *H04N 21/4788* | (2011.01) |
| *G02B 19/00* | (2006.01) |

(52) U.S. Cl.
CPC ............ *H04N 7/15* (2013.01); *G02B 19/0014* (2013.01); *G02B 19/0076* (2013.01); *H04N 5/2251* (2013.01); *H04N 5/2254* (2013.01); *H04N 7/142* (2013.01); *H04N 21/4223* (2013.01); *H04N 21/42203* (2013.01); *H04N 21/4788* (2013.01)

(58) Field of Classification Search
USPC .................................................... 348/14.08
See application file for complete search history.

(56) References Cited

U.S. PATENT DOCUMENTS

| | | |
|---|---|---|
| 4,235,541 A | 11/1980 | Jamel |
| 6,362,918 B1 | 3/2002 | Netzer |
| 6,889,006 B2 | 5/2005 | Kobayashi |

(Continued)

FOREIGN PATENT DOCUMENTS

| | | |
|---|---|---|
| JP | 2006-251150 B1 | 9/2006 |
| JP | 2007-206137 B1 | 8/2007 |
| WO | 2006-002674 A1 | 1/2006 |

OTHER PUBLICATIONS http://www.amazon.com/Angle-Macro-iPhone-connected-together/dp/B005GTR1CA (Aug. 17, 2013).

(Continued)

*Primary Examiner* — Amal Zenati (57) ABSTRACT

Portable, mobile, lightweight, removable, low cost, easy to manufacture, easy to ship, easy to transport, easy to store, and easy to use optical adapters that provides an effective means of videoconferencing over a mobile phone or other mobile device with a camera. Embodiments include landscape and portrait adapters that can be easily applied, used and removed while maintaining a professional and aesthetic appearance. Small mirrors within the optical adapter allow light from the front of the mobile device to enter the adapter and be conditioned and redirected into the built-in lens of the camera on the back of the mobile device. Novel embodiments include a lens reverser and/or a re-lens. Optical adapters also provide for self-imaging or surveillance. Various protective cases and adapter embodiments are configured to match specific mobile devices.

20 Claims, 8 Drawing Sheets

BACK VIEW

(56) References Cited

U.S. PATENT DOCUMENTS

| | | |
|---|---|---|
| 7,106,357 B2 | 9/2006 | Fukuda |
| 7,639,353 B2 | 12/2009 | Rooke |
| 7,830,628 B2 * | 11/2010 | Schaefer ................ G02B 7/02 |
| | | 359/819 |
| 7,936,504 B2 | 5/2011 | Goodman |
| 7,967,513 B2 | 6/2011 | Zhang |
| 8,279,544 B1 | 10/2012 | O'Neill |
| 2007/0082700 A1 | 4/2007 | Landschaft |
| 2007/0116454 A1 * | 5/2007 | Tsai ....................... G03B 17/17 |
| | | 396/287 |
| 2007/0275763 A1 | 11/2007 | Sawadski |
| 2007/0280677 A1 | 12/2007 | Drake |
| 2009/0046075 A1 | 2/2009 | Kim |
| 2009/0109558 A1 | 4/2009 | Schaefer |
| 2009/0115872 A1 | 5/2009 | Lazaridis |
| 2009/0181729 A1 * | 7/2009 | Griffin, Jr. .......... H04N 5/2254 |
| | | 455/575.1 |
| 2010/0048243 A1 | 2/2010 | Fourquin |
| 2010/0285832 A1 | 11/2010 | Mosley |
| 2010/0328420 A1 | 12/2010 | Roman |
| 2011/0110654 A1 | 5/2011 | Maki |

OTHER PUBLICATIONS http://www.amazon.com/NEEWER®-Angle-Macro-Apple-iPhone/dp/B009UQR32I (Aug. 17, 2013).
http://www.amazon.com/Arrvial-Fisheye-Detachable-Portable-Camera/dp/B009UD1W46 (Aug. 17, 2013).

\* cited by examiner

SIDE VIEW
Fig. 1A

BACK VIEW
Fig. 1B

SIDE VIEW

FRONT VIEW   BACK VIEW

Fig. 4A      Fig. 4B

FRONT VIEW
Fig. 5A

BACK VIEW
Fig. 5B

FRONT VIEW
Fig. 5C

BACK VIEW
Fig. 5D

BACK VIEW
Fig. 6A

BACK VIEW

Fig. 6B

BACK VIEW

Fig. 6C

OPTICAL ADAPTERS FOR MOBILE DEVICES WITH A CAMERA

RELATED APPLICATIONS

The following design patent applications are included herein by reference:

U.S. Design Patent Application, entitled "Optical Adapter for Mobile Device," Ser. No. 29/315,499 filed concurrently on Jun. 29, 2009.

U.S. Design Patent Application, entitled "Case for Optical Adapter and Mobile Device," Ser. No. 29/315,497 filed concurrently on Jun. 29, 2009.

U.S. Design Patent Application, entitled "Case for Optical Adapter and Mobile Device," Ser. No. 29/315,498 filed concurrently on Jun. 29, 2009.

U.S. Design Patent Application, entitled "Case for Optical Adapter and Mobile Device," Ser. No. 29/315,500 filed concurrently on Jun. 29, 2009.

BACKGROUND

Field of Invention

The present invention relates to optical adapters, in particular optical adapters for mobile devices with still or video cameras.

Description of Prior Art

There is often a need or want to see the people we telecommunicate with. This allows us to see facial expressions, perform a show and tell, make presentations, etc., as if we were physically present. Visual mobile telecommunication is just emerging as a practical reality.

Videoconferencing adds a visual component to telecommunication and is becoming more popular especially with the current focus on global warming and the high cost of travel. Travel for face-to-face meetings is expensive, as well as bad for the environment. Conventionally, videoconferencing is performed using specialized hardware and software or via personal computers. This equipment is not easily portable or mobile. People are often confined to the rooms permanently supporting the videoconferencing equipment or the network required for the telecommunication.

Mobile devices with digital cameras, such as various cell phones, Blackberry, iPhone, iTouch, or other iPhone-like devices have processors that execute computer programs. The programs respond to user input from various buttons or touch displays, handle networking, capture and play audio, capture and display digital images, including video, and perform other functions.

Conventional wired phones and cellular phones allow us to telecommunicate, but contain no visual component. Cell phones and cell phone use is globally ubiquitous these days. Almost everyone has a cell phone and cell phone networks are found throughout the world.

Research in Motion created the Blackberry, the first real business oriented mobile phone with e-mail, web browsing, etc. The Blackberry helped pave the way for high speed broadband mobile networks.

The iPhone and iTouch have a wireless network connection to the Internet.

With the iPhone, Apple Computers has revolutionized mobile phones. With a large touch screen and a slick, graphic rich interface, the iPhone sets the trend for mobile phones of the future. However, videoconferencing has not been commercially available for mobile phones, including the iPhone. One reason videoconferencing is not available on the iPhone, or other cell phones, is that the camera is on the back and so the users cannot see the screen while creating a video image of themselves.

Likewise, because the camera is on the back, users cannot take still pictures or videos of themselves, or people or other objects behind them. Video streams are comprised of a plurality of video frames.

What is needed is a portable, mobile, lightweight, removable, low cost, easy to manufacture, easy to ship, easy to transport, easy to store, and easy to use device that provides an effective means of videoconferencing over a mobile phone, such as the iPhone or other mobile devices with cameras which are not on the same side as the display.

SUMMARY OF THE INVENTION

It is an objective of the present invention to provide a portable, mobile, lightweight, removable, low cost, easy to manufacture, easy to ship, easy to transport, easy to store, and easy to use device that provides an effective means of videoconferencing over a mobile phone, such as the iPhone or other mobile devices with cameras.

OBJECTS AND ADVANTAGES

Accordingly, the present invention includes the following advantages:

a) To provide means and methods of videoconferencing that are portable.

b) To provide means and methods of videoconferencing that are mobile.

c) To provide means and methods of videoconferencing that are lightweight.

d) To provide means and methods of videoconferencing that are easy to use.

e) To provide means and methods of videoconferencing that offer full color.

f) To provide means and methods of videoconferencing that can be quickly and easily set up.

g) To provide means and methods of optical adapters that can be quickly applied and removed.

h) To provide means and methods of videoconferencing that can be quickly and easily used.

i) To provide means and methods of videoconferencing that are minimal in cost and waste.

j) To provide an inexpensive optical adapter for a mobile device with a camera.

k) To provide a simpler way of making an optical adapter for a mobile device with a camera.

l) To provide a removable optical adapter for a mobile device with a camera.

m) To provide an easy to store optical adapter for a mobile device with a camera.

n) To provide an easy to transport optical adapter for a mobile device with a camera.

o) To provide a lightweight optical adapter for a mobile device with a camera.

p) To provide a simple way to manufacture optical adapters for a mobile device with a camera.

q) To provide an inexpensive way to manufacture an optical adapter for a mobile device with a camera.

r) To provide a simple way to ship optical adapters for the mobile device with a camera.

s) To provide an ideal optical adapter for people, groups of people, and organizations who prefer low maintenance and low cost optical adapters for a mobile device with a camera.

t) To provide a professional and aesthetic optical adapter for a mobile device with a camera.
u) To provide a stylized optical adapter for a mobile device.
v) To provide a cover configured to hold and protect an optical adapter and at least a portion of the mobile device.

DRAWING FIGURES

In the drawings, closely related figures have the same number but different alphabetic suffixes.

| REFERENCE NUMERALS IN DRAWINGS | |
|---|---|
| 100 | mobile device with camera |
| 102 | touch display |
| 104 | camera chip sensor |
| 106 | lens |
| 110 | camera |
| 120 (a-d) | ray of light |
| 140 (a-c) | top mirror |
| 142 (a-c) | bottom mirror |
| 150 (a-d) | housing |
| 200 | lens reverser |
| 210 | re-lens |
| 300 | first adapter configuration |
| 310 | second adapter configuration |
| 400 | wide adapter |
| 500 | narrow adapter |
| 510 | side adapter |
| 520 | adjustable adapter |
| 600 | iPhone |
| 602 (a-c) | button/toggle |
| 610 | horizontal casing |
| 620 | vertical casing |
| 630 | diagonal casing |
| 640 | full casing |
| 650 | adjustable casing |
| 652 | moveable arm |
| 654 | thumb knob |
| 656 | spring |

SPECIAL DEFINITIONS lens reverser—A lens, known as a "null lens," which counteracts the effects of another lens while leaving the other optical properties the same.

re-lens—A lens that reshapes the light consistent with an original lens which has been reversed with a lens reverser.

videoconference—Also known as a videoteleconference, a set of interactive telecommunication technologies which allow two or more locations to interact via two-way video and audio transmissions simultaneously.

DESCRIPTION OF THE INVENTION

Figure 1A:
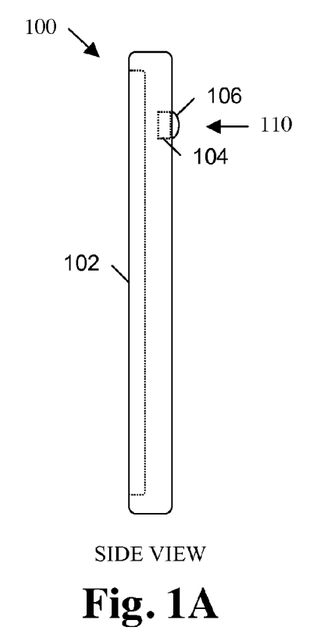
FIG. 1A illustrates a side view of a mobile device with a camera opposite from a display.

FIG. 1A illustrates a side view of an exemplary mobile device with a camera on the back, namely opposite from a display. The mobile device with camera 100 shown comprises both a touch display 102 in front and a camera 110 in the back. The camera 110 comprises a lens 106 and camera chip sensor 104, as shown in greater detail in FIG. 2. The camera 110 has been placed at the back of the phone to facilitate a visual of a photograph to be taken on the camera 110 via the touch display 102. In the embodiment shown, the touch display 102 consumes most of the frontal space of mobile device with camera 100. A mobile device with a touch display 102 is exemplary and is used to illustrate the structure and operations of various optical adapters. A mobile device with a non-touch screen could also use the optical adapters.

Figure 1B:
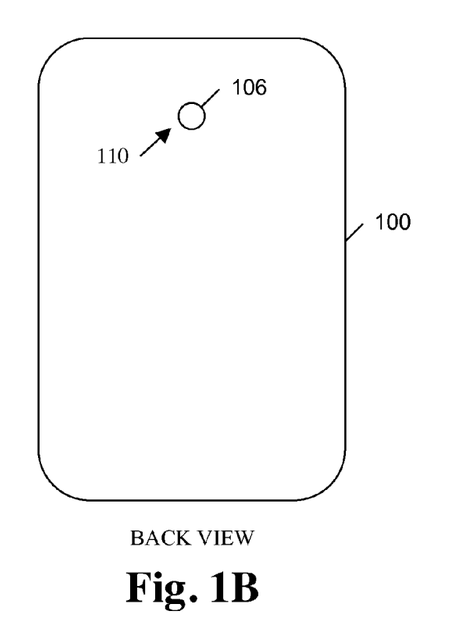
FIG. 1B illustrates the back view of a mobile device with a camera.

FIG. 1B illustrates the back view of a mobile device with a camera 100. The mobile device with camera 100 contains a camera 110 on the back comprising a lens 106. Only the lens 106 portion of camera 110 is visible.

Normal Light Input

Figure 2:
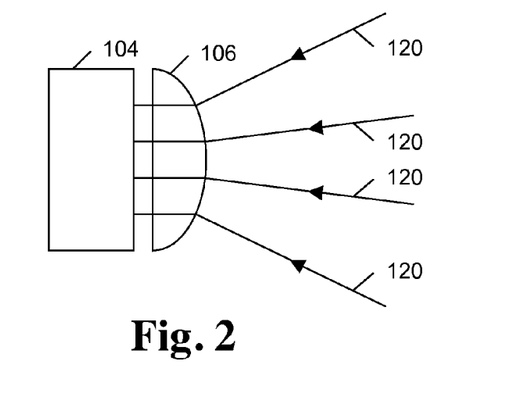
FIG. 2 illustrates normal light input into a camera lens.

FIG. 2 illustrates normal light input into a camera lens. The rays of light 120 (a-d) shine through lens 106 and refract into the camera chip sensor 104. The camera chip sensor 104 digitizes the rays of light 120 to form a digital image, namely a photograph or a frame of video. Digitizing a digital image is referred to a capturing an image.

Light Input Reflected via Dual Mirrors and a Lens Reverser

A novel aspect of the present invention is an optical adapter comprising a top mirror 140, a bottom mirror 142, and a novel lens reverser 200.

The terminology "top" and "bottom" are used consistent with the drawings to identify the respective mirrors. It is understood that the optical adapters could be rotated 90, 180, or 270 degrees, relative to the mobile device such that the "top mirror" would be on the right, bottom, and left, respectively, and the "bottom mirror" would be on the left, top, and right, respectively. Such rotation would not alter the elements of the structure nor alter operation of the claimed invention.

Figure 3A:
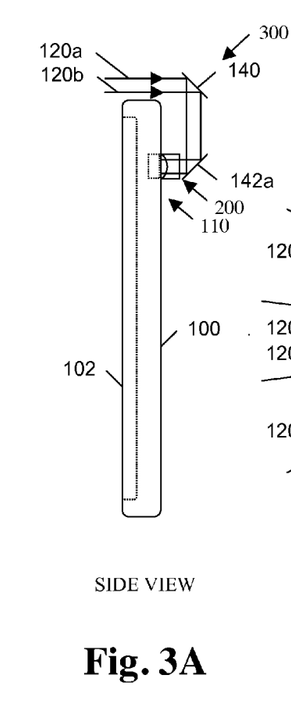
FIG. 3A illustrates a mobile device with a first adapter configuration.

FIG. 3A illustrates a mobile device 100 with a first adapter configuration 300. The first adapter configuration 300 is placed on the back of the mobile device with camera 100 opposite the touch screen 102. The rays of light 120 shine from in front of mobile device with camera 100 into the first adapter configuration 300 where it first reflects down off of top minor 140a and second reflects back in off of bottom mirror 142a, and ultimately enters into camera 110.

Figure 3B:
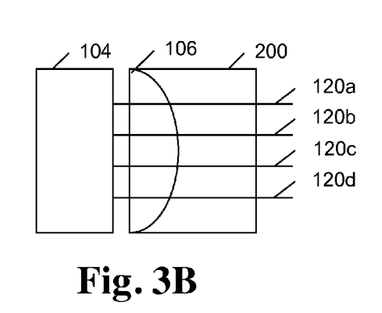
FIG. 3B illustrates light with lens reverser ("null lens").

FIG. 3B further illustrates the structure and operation of a novel lens reverser 200 of FIG. 3A. The rays of light 120 (a-d) shine straight through a lens reverser 200 and lens 106 respectively and are then digitized by the camera chip sensor 104 to form a digital image. The lens 106 and camera chip sensor 104 are both part of the mobile device with camera 100. The lens reverser 200 is configured to reverse the optical properties of the built-in lens 106. As shown here, the lens 106 has a convex outer surface, so to be effective the lens reverser has a precisely matching concave surface, such that in this example the light is straightened out. Once the light is straightened out it can travel any distance, from mirror to mirror, using the same lumen (or bore through a tubular adapter housing 150). In other situations, such as where the built-in lens 106 is behind a flat piece of exterior glass or plastic, the lens reverser 200 will have to be engineered to have the necessary reversing properties based on the external surface constraints and the precise distance that it will be mounted away from the refracting surface of the built-in lens 106

Figure 3C:
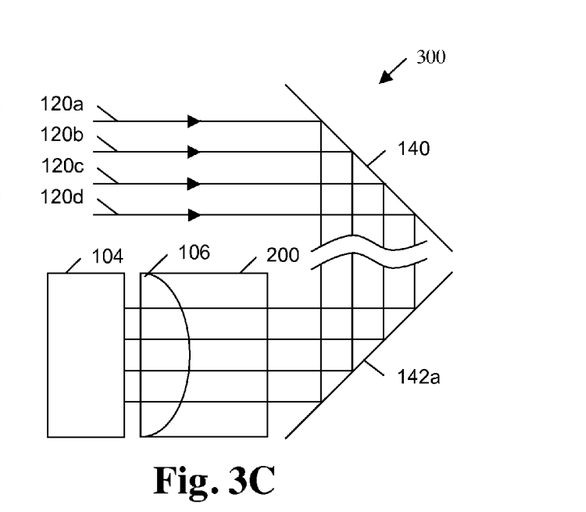
FIG. 3C illustrates a first adapter configuration.

FIG. 3C further illustrates the structure and operation of a first adapter configuration 300 of FIG. 3A. The rays of light 120 (*a-d*) shine from in front into the first adapter configuration 300 where it first reflects down off of top mirror 140*a* and second reflects back in off of bottom mirror 142*a*. Note that in this embodiment the minors are both at 45 degree angles. Next, the rays of light 120 (*a-d*) shine straight through a lens reverser 200 and lens 106, as a result of the lens reverser 200, and are then digitized by the camera chip sensor 104 to form a digital image. The lens 106 and camera chip sensor 104 are both part of the mobile device with camera 100. The lens reverser 200 and mirrors (140 and 142) are part of the optical adapter configuration 300.

The Addition of a Re-Lens

Figure 3D:
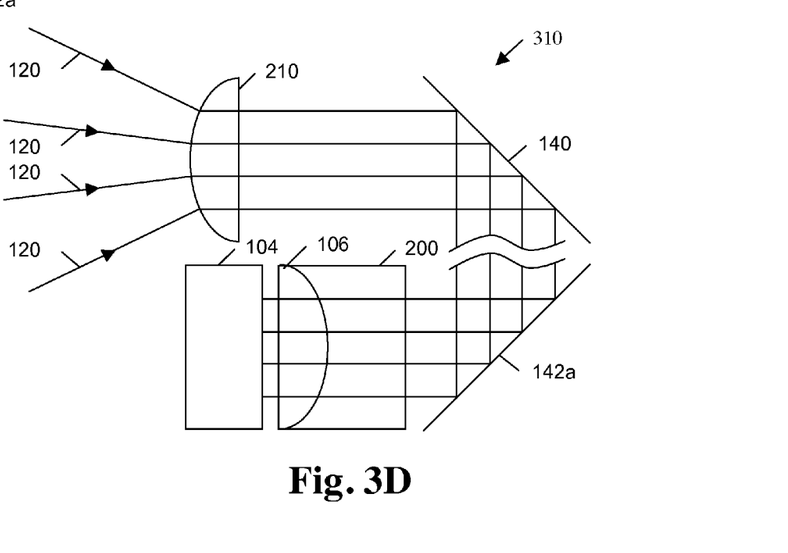
FIG. 3D illustrates a second adapter configuration.
Figure 5A:
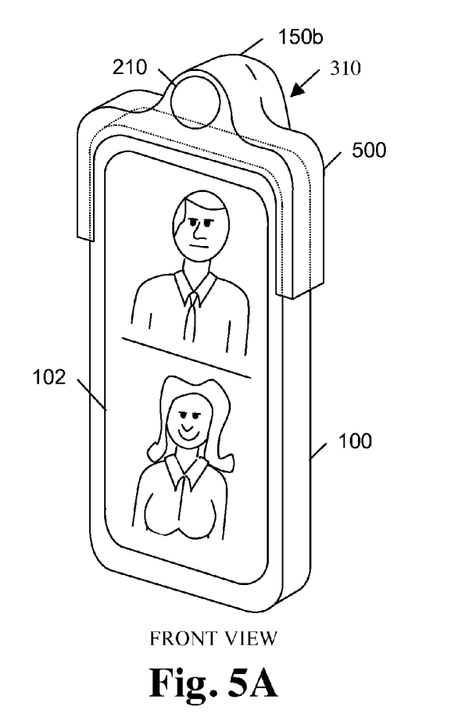
FIGS. 5A through 5D illustrate embodiments of narrow optical adapters for the mobile device with a camera.
Figure 5B:
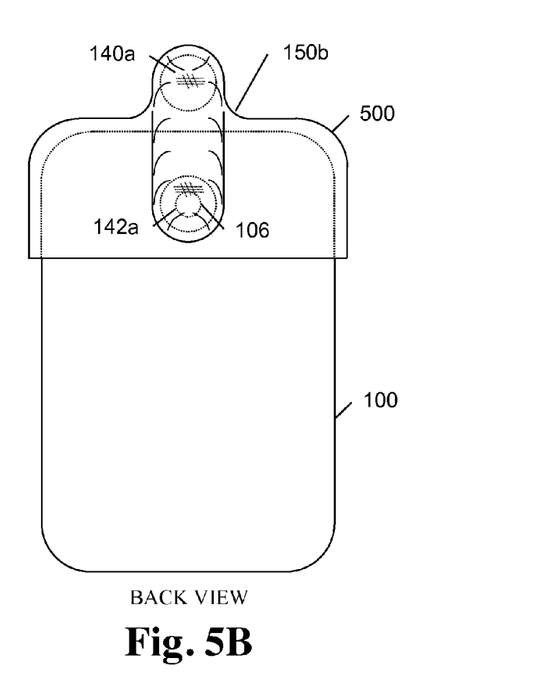
Figure 5C:
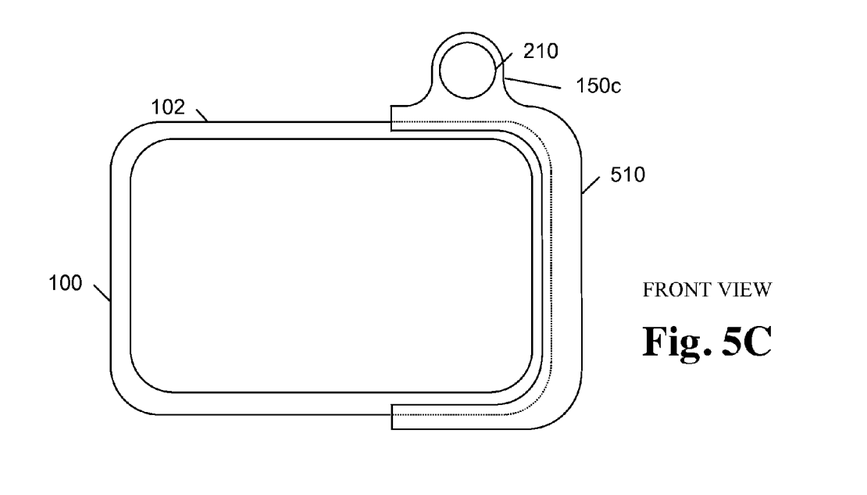

FIG. 3D illustrates a second adapter configuration such as shown in FIGS. 5A through 5C. The embodiment of the second adapter configuration 310 is similar to the first adapter configuration 300 (FIG. 3C) with the addition of re-lens 210. The rays of light 120 shine through the re-lens 210, which reshapes the light for the original camera lens 106. With the first adapter configuration 300, the light gathering properties of the built-in lens 106 are reversed. In order for the standard software to work on the mobile device, it is desirable to recreate substantially the same optical characteristics of how the light is gathered. The re-lens 210 in some embodiments where the light is substantially straightened could be identical to the original lens 106. In other embodiments, it may be beneficial to slightly modify the light gathering characteristics to better facilitate the intended use, namely self-imaging or videoconferencing, which may have a preferred focal range of about 18 inches, for example, when the mobile device is held in the hand of the user.

Mirror Angles Can Reduce Thickness of Optical Adapter Housing

Figure 3E:
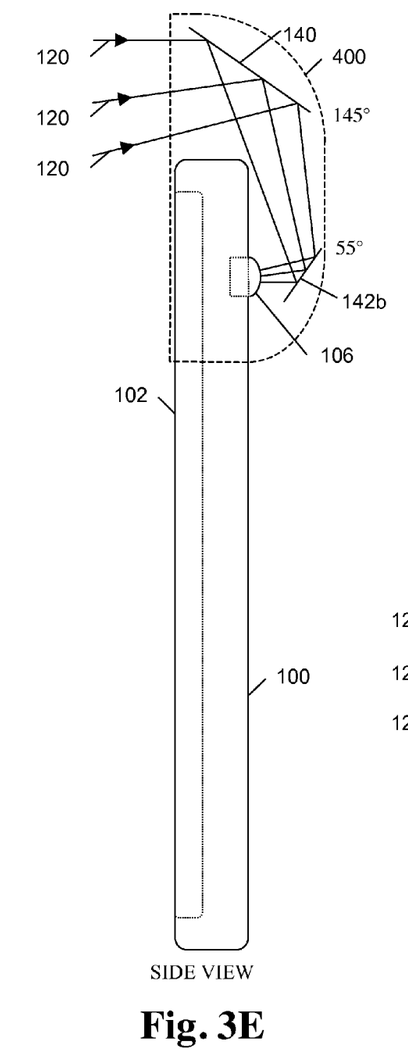
FIGS. 3E and 3F illustrate adapter operations with minor at various angles.
Figure 3F:
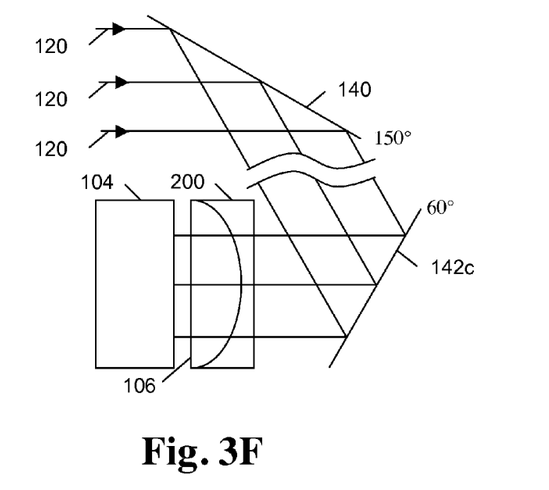

FIGS. 3E and 3F illustrate alternate adapter embodiments. FIG. 3E illustrates a side view of a mobile device with camera 100 shown having a touch display 102. Both FIGS. 3E and 3F illustrate the workings and inner components of the wide adapter 400.

FIG. 3E illustrates an embodiment where the rays of light 120 shine into and reflect down off of the wide top minor 140*b* (angled at 145 degrees), back in off of bottom minor 142*b* (angled at 55 degrees) and then into lens 106. Note that in this example, as shown, the light is gathered into the top minor 140*b* at an angle that is below perpendicular to the front face of the mobile device 100. In an alternate configuration the light could be gathered at an angle that is above perpendicular to the front face of the mobile device. FIG. 3E further illustrates that unlike FIGS. 3C and 3D, the mirrors do not have to be at 45 degree angles and this allows the top minor 140*b* to be position forward over the top edge of the mobile device 100. This allows the bottom mirror 142*b* to be smaller than the top minor 140*b*, and also allows the light to be gathered into a narrower beam as it enters the adapter and reflects from mirror to mirror. This eliminates the need for a lens reverser 200 or a re-lens 210 thus simplifying the optical adapter. This embodiment may be housed in a wide adapter 400 (shown in cross section by the dashed lines; see also FIGS. 4A and 4B.

FIG. 3F illustrates an embodiment where the rays of light 120 shine into and reflect down off of a wide top minor 140*c* (at 150 degrees), back in off of a bottom mirror 142*c* at 60 degrees, then through lens reverser 200, and ultimately into lens 106. This is another example where the mirrors are not necessarily at 45 degree angles and the top mirror 140*c* may be forward of top edge of the mobile device 100 (not shown but indicated by the relative position of the camera chip sensor 104 and the lens 106). In contrast to the example shown in FIG. 3E, the light is received at an angle that is perpendicular to the face of the mobile device 100 (not shown). This embodiment may also be housed in a wide adapter 400 (not shown).

Wide Optical Adapters for Mobile Devices with a Camera

Figures 4A, 4B:
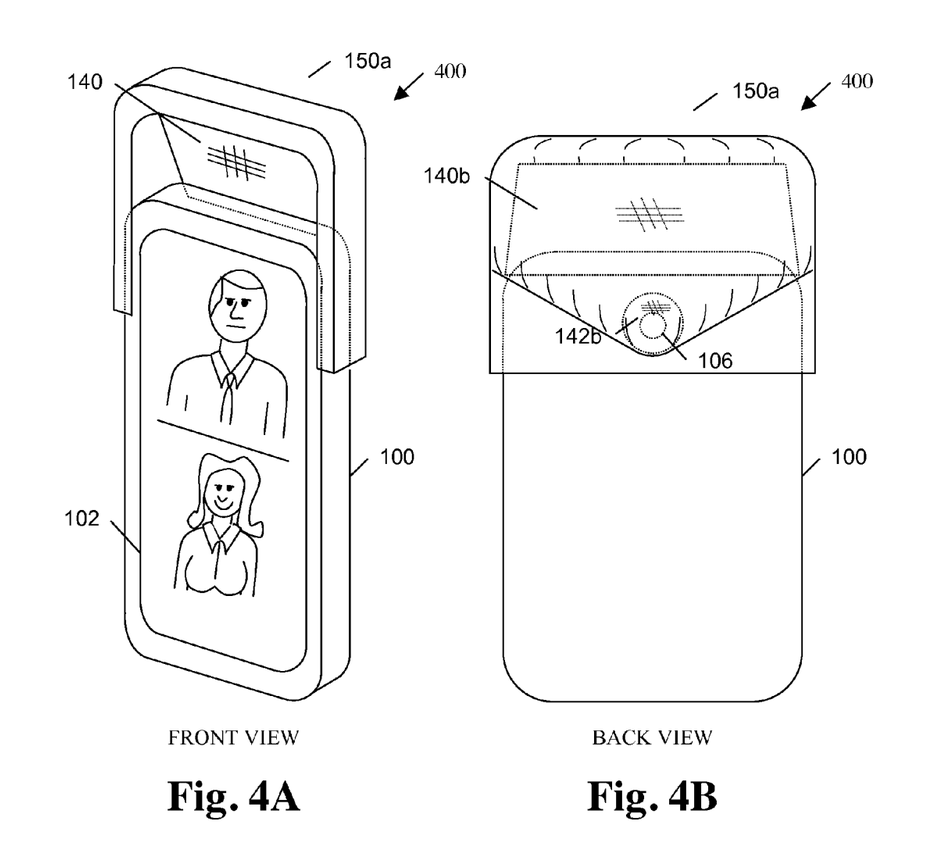
FIGS. 4A and 4B illustrate a phone with an optical adapter with wide top mirror.

FIGS. 4A and 4B illustrate a wide adapter 400 mounted on an exemplary mobile device with camera 100.

FIG. 4A illustrates a perspective front view of mobile device with camera 100. In this exemplary illustration the mobile device 100 has a touch display 102. The display 102 illustrates the mobile device 100 being used in a videoconference where the local user is facing the display 102 is able to simultaneously view both the image being transmitted and the image being received. Alternatively, the local user can be viewing more than one remote participant in the videoconference while simultaneously capturing the local image via the wide optical adapter 400. In this front view, the top mirror 140*b* is visualized angled over the top edge of the mobile device 100.

FIG. 4B illustrates a back view of mobile device with camera 100. The wide adapter 400 mounts onto the top of the mobile device with camera 100 and houses, for example, the first adapter configuration 300 of FIG. 3C, the embodiment shown in FIG. 3E or the embodiment shown in FIG. 3F. The wide adapter 400 is shown in this example comprising a rectangular wide top mirror 140*b* and a smaller round bottom minor 142*b* both held into position with a housing 150*a*. The rays of light 120 (not shown) pass through the adapter, as described above with each respective embodiment, and ultimately into the built-in lens 106.

The wide adapter 400 shown in FIGS. 4A and 4B is configured to slip on and off of the mobile device 100. This allows for easy setup and use. The optical adapter can be easily transported attached to the mobile device 100, for example in a garment pocket, or holster. Alternatively it can be transported separately and removably attached when needed. The housing 150*a* of the wide adapter 400 protects the internal components of the optical adapter and may be configured to mate with specific mobile devices 100.

Narrow Optical Adapters for Mobile Devices with a Camera

FIGS. 5A through 5D illustrate narrow embodiments of optical adapters for the mobile device with a camera 100.

FIG. 5A illustrates a perspective front view of a narrow adapter 500 mounted on an exemplary mobile device with camera 100. In this exemplary illustration the mobile device 100 has a touch display 102. The display 102 illustrates the mobile device 100 being used in a videoconference where the local user is facing the display 102 is able to simultaneously view both the image being transmitted and the image being received. Alternatively, the local user can be viewing more than one remote participant in the videoconference while simultaneously capturing the local image via the narrow adapter 500.

FIG. 5B illustrates a back view of the narrow adapter 500 mounted on the exemplary mobile device with camera 100.

The narrow adapter 500 mounts onto the top of the mobile device with camera 100 and houses, for example, the second adapter configuration 310, as described in reference to FIG. 3D. The narrow adapter 500 comprises a re-lens 210, a top mirror 140*a*, a bottom mirror 142*a*, and a lens reverser 200 all held into position with a housing 150b. As shown in FIG. 5A, the re-lens 210 may be in the same plane as the display 102. As shown in FIG. 5B, in this embodiment, each of the lens 106, bottom mirror 142a and top mirror 140a are round. In this example, the top mirror 140a and the bottom mirror 142a are about the same size, which is made possible by the light straightening features of the lens reverser 200 (see FIG. 3D) and the beam being able to pass through the same sized lumen between the mirrors (140a and 142a).

The narrow adapter 500 shown in FIGS. 5A and 5B is configured to slip on and off of the mobile device 100. This allows for easy setup and use. The optical adapter can be easily transported attached to the mobile device 100, for example in a garment pocket, or holster. Alternatively it can be transported separately and removably attached when needed. The housing 150b of the narrow adapter 400 protects the internal components of the optical adapter and may be configured to mate with specific mobile devices 100.

FIG. 5C illustrates the front view of a side adapter 510 mounted on an exemplary mobile device with camera 100 in a landscape position. The side adapter 510 mounts onto the mobile device with camera 100 and houses, for example, the second adapter configuration 310, as described in reference to FIG. 3D. The side adapter 500 comprises a re-lens 210, a top mirror 140a, a bottom mirror 142a, and a lens reverser 200 all held into position with a housing 150c. As shown in FIG. 5C, the re-lens 210 may be in the same plane as the display 102. The landscape position allows the camera 110 (not shown) to capture images and display them at a wider angle.

The side adapter 510 shown in FIG. 5C is configured to slip on and off of the mobile device 100. This allows for easy setup and use. The optical adapter can be easily transported attached to the mobile device 100, for example in a garment pocket, or holster. Alternatively it can be transported separately and removably attached when needed. The housing 150c of the side adapter 510 protects the internal components of the optical adapter and may be configured to mate with specific mobile devices 100. The side adapter 510 reduces the overall length of the combined system comprising the mobile device 100 and the side adapter 510, when compared to the wide adapter 400 shown in FIG. 4A or the narrow adapter 500 shown in FIG. 5A.

Figure 5D:
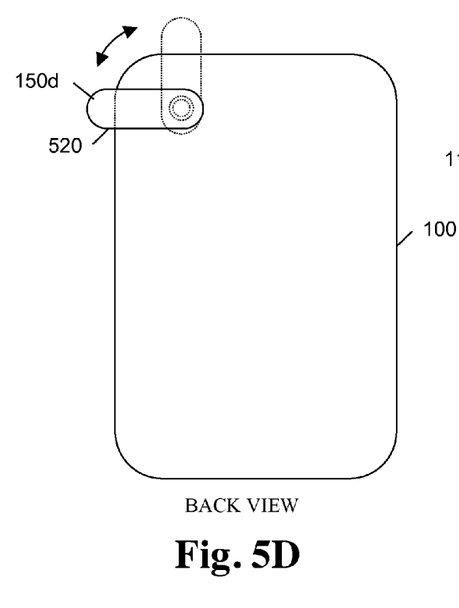

FIG. 5D shows an adjustable adapter 520 which is be mounted on a mobile device with a camera 100. The adjustable adapter 520 may comprise, for example, the second adapter configuration 310, as described in reference to FIG. 3D. The adjustable adapter 520 may comprise a re-lens 210, a top mirror 140a, a bottom mirror 142a, and a lens reverser 200 all held into position with a housing 150d. The adjustable adapter 520 can be positioned in either a vertical or horizontal position. In one embodiment, it may be attached with a swivel attachment allowing it to be rotated 90 degrees by the user. Once positioned it may alternatively be held in place by a flexible cover, such as a rubberized skin or leather case (not shown).

Adapters for iPhone G3

After my initial drawings for optical adapter, Apple released a new version of the iPhone, the iPhone G3, which has a few notable features including locating the camera 110 in a corner on the back and various buttons/toggles 602(a-c) at the top and side. FIGS. 6A through 6E illustrate alternate embodiments of optical adapters for, but not limited to, the iPhone 600. The optical adapters are not limited to the iPhone, and may be used or modified for use with other mobile devices with cameras available now and in the future.

These adapters can be easily applied to and removed from the mobile device with a camera, such as an iPhone, or iPhone-like device. Application for these adapters may be performed directly over an existing skin, cover, or protector so that the existing skin does not have to be removed for videoconferencing use.

Figure 6A:
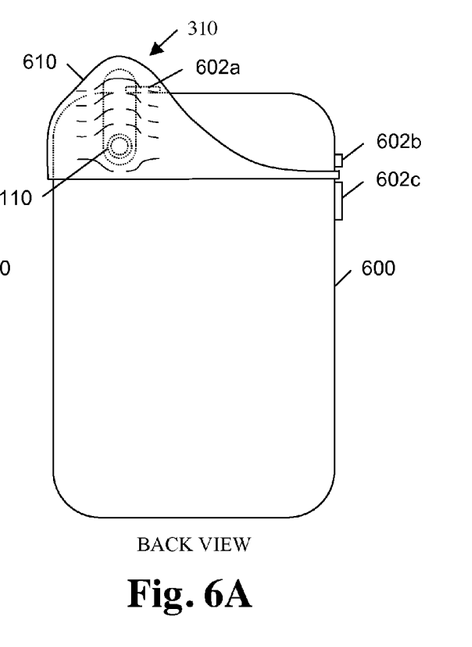
FIGS. 6A through 6E illustrate embodiments of optical adapters within cases for an iPhone or similar mobile device.

FIG. 6A shows an iPhone 600 with an optical adapter having a second adapter configuration 310 (in a housing 150d, not shown, similar to adjustable adapter 520), held in place by a horizontal casing 610 which clips over the upper left corner and reaches out between the buttons/toggles 602(b-c) on the side. In addition, cutouts provide access and operation of the button/toggle 602a on the top.

Figure 6B:
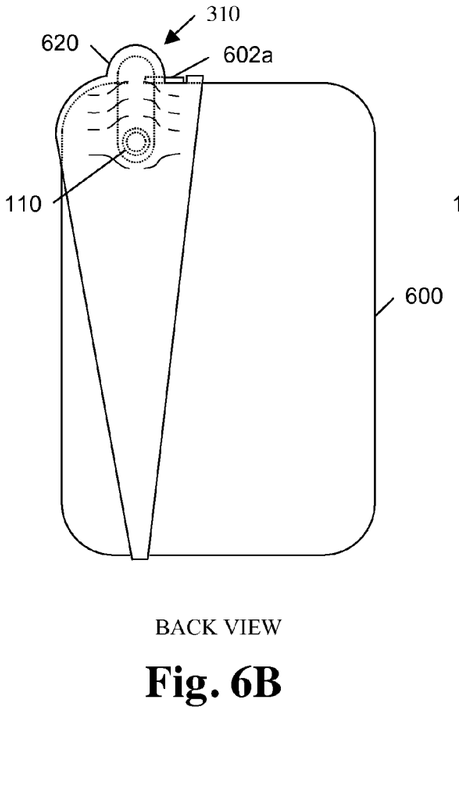

FIG. 6B shows an iPhone 600 with an optical adapter having a second adapter configuration 310, held in place by a vertical casing 620 that clips over the upper left corner and reaches down to the bottom. In addition, cutouts provide access and operation of the button/toggle 602a on the top.

Figure 6C:
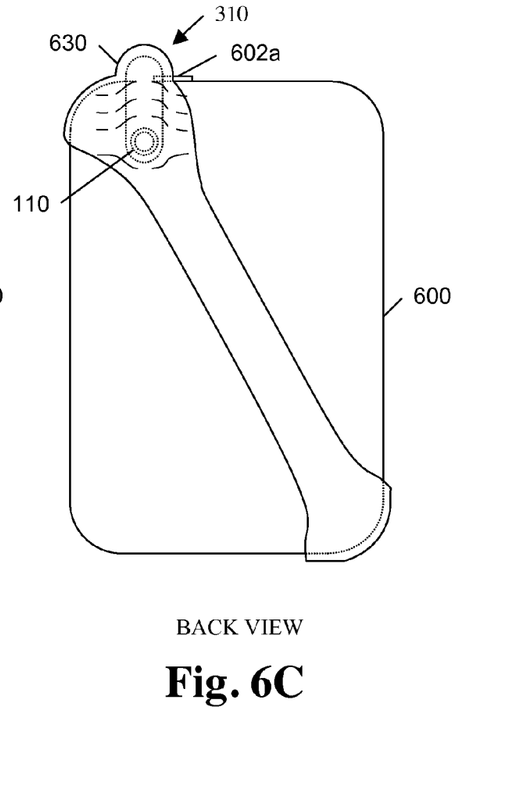

FIG. 6C shows an iPhone 600 with an optical adapter having a second adapter configuration 310, held in place by a diagonal casing 630 that clips over the upper left corner and reaches down over the bottom right corner. In addition, cutouts provide access and operation of the button/toggle 602a on the top.

Figure 6D:
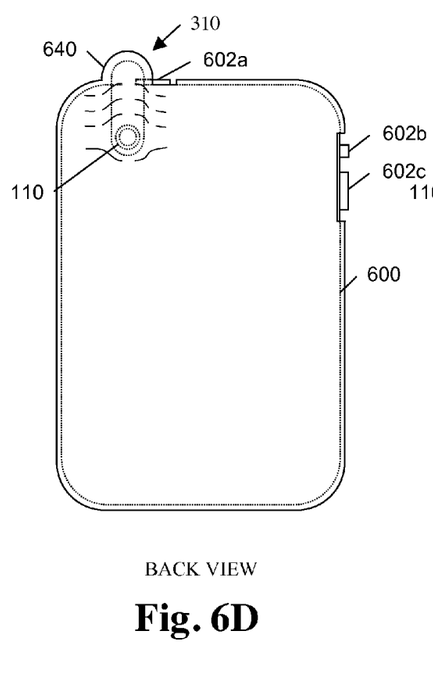

FIG. 6D shows an iPhone 600 with an optical adapter having a second adapter configuration 310, held in place by a full casing 640 that clips over the entire iPhone 600 (over all 4 corners). The entire front of the iPhone 600, including touch display 102, is uncovered and operational. In addition, cutouts provide access and operation of the buttons/toggles 602(a-c).

Figure 6E:
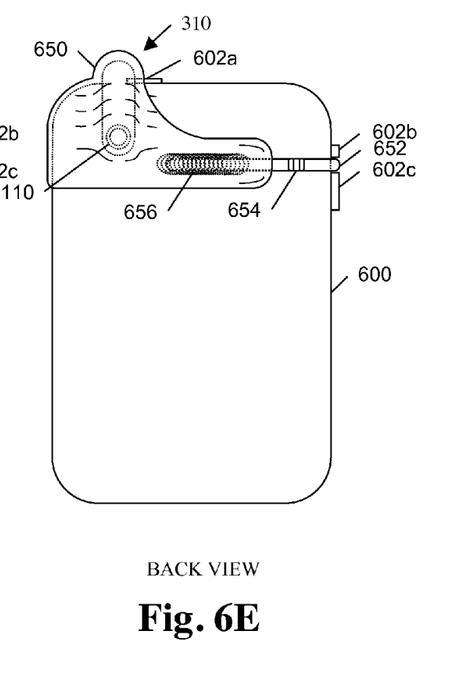

FIG. 6E shows an iPhone 600 with an optical adapter having a second adapter configuration 310, held in place by an adjustable casing 650 which clips over the upper left corner and moveable arm 652 reaches out between the buttons/toggles 602(b-c) and clips along the sides and front. The spring 656 inside the adjustable casing 650 provides the inward tension to keep the adapter firmly in place. This allows the adjustable casing 650 to fit over an existing cover or skin, and allows the adjustable casing to fit directly on the mobile device (e.g. iPhone 600). The thumb knob 654 provides leverage to allow the moveable arm 652 to be pulled open and have the adjustable casing removed. In addition, the buttons/toggles 602(a-c) are unobstructed.

The various casing embodiments can be made of rigid plastic or metal. Alternative they can be molded of soft plastic or silicon and configured to go over a plastic or metal housing 150d. Still another alternative is for the casing to be made of leather with appropriate internal or edge reinforcements.

Advantages
Videoconferencing

These improved optical adapters allow videoconferencing with a mobile device with a camera.

Self-Imaging

These improved optical adapters allow users to take images of themselves while viewing the display. Alternative this allows users to take pictures over their shoulders, which may be useful for surveillance or, for example, discrete celebrity sightings.

Portable

These improved optical adapters are small and therefore portable.

Mobile

These improved optical adapters are mobile. They can be used with a mobile phone and can be used anywhere a mobile phone can. Thus, they facilitate videoconference while on the run, during traveling, or from remote locations.

Lightweight

These improved optical adapters are lightweight.

Removable

These improved optical adapters are easily applied and removed.

Low Cost

These improved optical adapters are low cost. They can be made of materials that are smaller, thus ultimately less expensive.

Easy to Manufacture

These improved optical adapters are easy to make or to manufacture, having a simple set of parts and configurations.

Easy to Ship

These improved optical adapters are small and, therefore, easy to ship.

Easy to Transport

These improved optical adapters are small and, therefore, easy to transport in a purse or pocket.

Easy to Store

These improved optical adapters are small and, therefore, easy to store in a drawer, purse or pocket.

Easy to Use

These improved optical adapters are ideal for people, groups of people, and organizations who prefer low maintenance and low cost optical adapters that can be easily applied and removed and used anywhere mobile phones can be used.

Professional and Aesthetic Appearance

These optical adapters have a professional and aesthetic appearance that integrates well with the mobile device with a camera.

Conclusion, Ramification, and Scope

Accordingly, the reader will see that the portable, mobile, lightweight, removable, low cost optical adapters are easy to manufacture, easy to ship, easy to transport, easy to store, easy to use, and have a professional and aesthetic appearance.

While the above descriptions contain several specifics these should not be construed as limitations on the scope of the invention, but rather as examples of some of the preferred embodiments thereof. Many other variations are possible. For example minors in optical adapters can be made in different shapes, sizes, and angles. Further, for example, additional optical elements could be added to the light beam, such as additional minors or lenses, even automatic focus or manual focus lenses. Further, the cases could have different designs than those shown here but have the same functions of holding the optical adapter in place or protecting the optical adapter as well as the mobile device. Protective cases made of different materials and having different stylistic designs would also be within the scope of the invention. The variations could be used without departing from the scope and spirit of the novel features of the present invention.

Accordingly, the scope of the invention should be determined not by the illustrated embodiments, but by the appended claims and their legal equivalents.

The invention claimed is:

1. An optical adapter configured to be selectively attachable to a mobile device having a camera,
    the mobile device comprising:
        i) a front comprising a display,
        ii) a back comprising a built-in lens positioned over a camera chip sensor of the camera,
        iii) a top edge,
        iv) a side edge, and
        v) a corner formed between the top edge and the side edge, the optical adapter comprising:
    a) an adapter lens, and
    b) a casing configured to clip on the mobile device and to position the adapter lens over the built-in lens,
    wherein the casing comprises:
        i) a back member configured to match the back of the mobile device, the back member attached to the adapter lens,
        ii) a top edge member configured to match the top edge of the mobile device, the top edge member connected to the back member,
        iii) a side edge member configured to match the side edge of the mobile device, the side edge member connected to the back member,
        iv) a rounded corner member configured to match the corner of the mobile device, the corner member connected to the back member, and
        v) a front member configured to match the front of the mobile device, the front member attached to at least one of the group of the top edge member, the side edge member, and the corner member,
    wherein the adapter lens is configured to condition an image of light received by the camera to create a digital image,
    wherein the casing is attached to the mobile device by clipping the casing over the entire rounded corner of the mobile device covering said corner from the back member to the front member, and
    wherein the front member of the casing is configured such that all of the display is visible when the optical adapter is attached to the mobile device.

2. The optical adapter of claim 1 wherein the display of the mobile device is a touch display, and wherein the front member of the casing is configured such that all of the touch display is accessible via touch when the optical adapter is attached to the mobile device.

3. The optical adapter of claim 1,
    wherein the built-in lens of the mobile device is located near the corner,
    wherein the adapter lens is positioned near the corner member of the casing,
    wherein the top member of the casing has a length that is less than a top length of the top edge, and
    wherein the side member of the casing has a length that is less than a side length of the side edge.

4. The optical adapter of claim 3, wherein the mobile device is an iPhone-like device, and wherein the casing is configured to match a shape of the corner of the iPhone-like device.

5. The optical adapter of claim 1, wherein the mobile device is an iPhone, and wherein the casing is configured to match a shape of the corner of the iPhone.

6. The optical adapter of claim 1, wherein the mobile device is an iTouch, and wherein the casing is configured to match a shape of the corner of the iTouch.

7. The optical adapter of claim 1, wherein the casing further comprises a second side edge member and a second rounded corner member,
    wherein the second side edge member is connected to the back member,
    wherein the second rounded corner member is connected to the back member, the second rounded corner member configured to match a second corner of the mobile device, wherein the casing is attached to the mobile device by clipping the casing over the corner and the second corner of the mobile device.

8. The optical adapter of claim 1, wherein the built-in lens of the mobile device is centered between the side edge and a parallel second side edge; wherein the adapter lens is aligned over the centered built-in lens.

9. The optical adapter of claim 1, further comprising:
a) a rigid housing, connected to the casing,
b) a first reflective surface, connected to the housing, positioned to reflect light coming from in front of the mobile device over one of the top edge and the side edge of the mobile device, and
c) a second reflective surface, connected to the housing, positioned to reflect light coming from the top reflective surface to the built-in lens,
whereby one or more objects located in the front of the mobile device, which is opposite from the back of the mobile device having the built-in lens, is captured by the camera chip sensor creating the digital image.

10. The optical adapter of claim 1, further comprising:
a) a rigid housing, connected to the casing, and
b) a second adapter lens.

11. The optical adapter of claim 1, further comprising:
a) a rigid housing, connected to the casing,
b) a second adapter lens, connected to the housing,
c) a first reflective surface, connected to the housing, positioned to reflect light coming from in front of the mobile device over one of the top edge and the side edge of the mobile device,
d) a second reflective surface, connected to the housing, positioned to reflect light coming from the top reflective surface to the built-in lens,
wherein the second adapter lens is configured to condition the image of light prior to the light passing to the adapter lens,
whereby one or more objects located in the front of the mobile device, which is opposite from the back of the mobile device having the built-in lens, is captured by the camera chip sensor creating the digital image.

12. The optical adapter of claim 1 wherein the optical adapter is rotated 180 degrees.

13. The optical adapter of claim 1 wherein the digital image is a still photograph.

14. The optical adapter of claim 1 wherein the digital image is a frame of a video.

15. A method of videoconferencing using the optical adapter of claim 9, the method comprising the steps of:
a) providing the optical adapter,
b) providing a computer program to be run on a processor in the mobile device,
c) executing the computer program to repeat the following substeps:
i) capturing a frame of video from the light originating from a person in front of the display of the mobile device,
ii) transmitting the frame of video over a network, wherein the video being captured is displayed to the person on the display.

16. A method of manufacturing the optical adapter of claim 9, the method comprising the steps of:
a) shaping the casing to match a predetermined mobile device,
b) mounting the adapter lens in the casing,
c) mounting the first and second reflective surfaces in the rigid housing, and
d) removably attaching the rigid housing to the casing.

17. A method of manufacturing the optical adapter of claim 9, the method comprising the steps of:
a) shaping the casing to match a predetermined mobile device,
b) mounting the adapter lens and the first and second reflective surfaces in the casing.

18. A method of manufacturing the optical adapter of claim 10, the method comprising the steps of:
a) shaping the casing to match a predetermined mobile device,
b) mounting at least one of the lenses in the rigid housing, and
c) removably attaching the rigid housing to the casing.

19. The optical adapter of claim 1, wherein the casing is adjustable to clip over a corner of a plurality of mobile devices, forming an adjustable casing.

20. An optical adapter clip configured to be removable attached to a mobile device having a camera,
the mobile device comprising:
i) a front comprising a display,
ii) a back comprising a built-in lens positioned over a camera chip sensor of the camera, and
iii) a corner,
the optical adapter clip comprising a casing configured to clip on the mobile device and to position an optical element over the built-in lens of the mobile device, the casing comprising:
i) a back member configured to match the back of the mobile device,
ii) a rounded corner member configured to match the corner of the mobile device, the corner member connected to the back member,
iii) a front member configured to match the front of the mobile device, the front member attached to the corner member,
wherein the casing is configured to receive the optical element, the optical element being configured to condition an image of light received by the camera to create a digital image,
wherein the casing is attached to the mobile device by clipping the casing over the entire rounded corner of the mobile device covering said corner from the back member to the front member,
wherein the front member of the casing is configured such that all of the display is visible when the optical adapter is attached to the mobile device.

* * * * *